(12) United States Patent
Wang et al.

(10) Patent No.: US 12,249,731 B2
(45) Date of Patent: Mar. 11, 2025

(54) BATTERY MODULE, BATTERY PACK, AND APPARATUS USING BATTERY CELL AS POWER SUPPLY

(71) Applicant: CONTEMPORARY AMPEREX TECHNOLOGY CO., LIMITED, Fujian (CN)

(72) Inventors: Xuguang Wang, Fujian (CN); Wencai Xu, Fujian (CN); Jihua Yao, Fujian (CN); Gen Cao, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 502 days.

(21) Appl. No.: 17/563,933

(22) Filed: Dec. 28, 2021

(65) Prior Publication Data

US 2022/0123422 A1    Apr. 21, 2022

Related U.S. Application Data

(63) Continuation of application No. PCT/CN2020/121721, filed on Oct. 17, 2020.

(30) Foreign Application Priority Data

Oct. 21, 2019   (CN) .......................... 201921769178.7

(51) Int. Cl.
*H01M 50/298* (2021.01)
*B60L 50/64* (2019.01)
(Continued)

(52) U.S. Cl.
CPC .......... *H01M 50/298* (2021.01); *B60L 50/64* (2019.02); *H01M 50/103* (2021.01);
(Continued)

(58) Field of Classification Search
CPC combination set(s) only.
See application file for complete search history.

(56) References Cited

U.S. PATENT DOCUMENTS 9,425,446 B2   8/2016  Watanabe et al.
2014/0087229 A1 * 3/2014  Watanabe ........... H01M 50/271
                                                                                                    429/99
(Continued)

FOREIGN PATENT DOCUMENTS

CN        201156558 Y    11/2008
CN        103682201 A     3/2014
(Continued)

OTHER PUBLICATIONS

International Search Report dated Jan. 19, 2021 issued in PCT/CN2020/121721.
(Continued)

*Primary Examiner* — Daniel S Gatewood
(74) *Attorney, Agent, or Firm* — Scully, Scott, Murphy & Presser, P.C.

(57) ABSTRACT

The present application relates to the technical field of energy storage devices, in particular to a battery module, a battery pack, and an apparatus using a battery cell as a power supply, the battery module comprising: a plurality of battery cells, stacked along a length direction; a cover plate, located at an end portion of the battery cells along a height direction; and a wire harness isolation plate assembly, located between the cover plate and the battery cells along the height direction, where the cover plate is plug-connected to the wire harness isolation plate assembly. The solutions of the present application helps to increase energy density of the battery module through reducing the thickness of the cover plate and the wire harness isolation plate assembly while simul- (Continued)

taneously improving the connecting reliability of the cover plate and the wire harness isolation plate assembly.

18 Claims, 9 Drawing Sheets

(51) Int. Cl.
  *H01M 50/103* (2021.01)
  *H01M 50/209* (2021.01)
  *H01M 50/271* (2021.01)
  *H01M 50/502* (2021.01)

(52) U.S. Cl.
  CPC ....... *H01M 50/209* (2021.01); *H01M 50/271* (2021.01); *H01M 50/502* (2021.01); *H01M 2220/20* (2013.01)

(56) References Cited

U.S. PATENT DOCUMENTS

| | | | |
|---|---|---|---|
| 2016/0301049 A1 | 10/2016 | Zhu et al. | |
| 2018/0131209 A1* | 5/2018 | Lin | H01M 10/44 |
| 2019/0115702 A1 | 4/2019 | Kawaguchi et al. | |
| 2020/0091478 A1* | 3/2020 | Sasaki | H01M 50/507 |

FOREIGN PATENT DOCUMENTS

| | | | | |
|---|---|---|---|---|
| CN | 206806397 U | 12/2017 | | |
| CN | 206806497 U | 12/2017 | | |
| CN | 207818716 U | 9/2018 | | |
| CN | 208767371 U | 4/2019 | | |
| CN | 210743992 U | 6/2020 | | |
| JP | 2007165164 A | 6/2007 | | |
| JP | 2014067648 A | 4/2014 | | |
| JP | 2015185226 A | 10/2015 | | |
| JP | 2018101496 A | 6/2018 | | |
| JP | 2019125474 A | 7/2019 | | |
| KR | 20140040629 A | 4/2014 | | |
| KR | 20180036863 A | 4/2018 | | |
| KR | 20190054709 A | 5/2019 | | |
| WO | WO-2018123784 A1 * | 7/2018 | ............. | H01G 11/10 |

OTHER PUBLICATIONS

International Search Report and Written Opinion dated Jan. 19, 2021 received in International Application No. PCT/CN2020/121721.

Notice of Reasons for Refusal dated Jun. 5, 2023 received in Japanese patent Application No. JP 2022-523491.

Extended European Search Report dated May 9, 2022 received in European Patent Application No. EP 20879220.0.

Notice of Preliminary Rejection dated Aug. 15, 2024 received in Korean patent Application No. 10-2022-7012840.

Notice of Allowance dated Jan. 1, 2025 received in Korean Patent Application No. 10-2022-7012840.

* cited by examiner

BATTERY MODULE, BATTERY PACK, AND APPARATUS USING BATTERY CELL AS POWER SUPPLY

CROSS-REFERENCE TO RELATED APPLICATIONS

This application is a continuation of International Application No. PCT/CN2020/121721, filed on Oct. 17, 2020, which claims priority to Chinese Patent Application No. 201921769178.7, filed on Oct. 21, 2019. The disclosures of the aforementioned applications are hereby incorporated by reference in their entireties.

TECHNICAL FIELD

The present application relates to the technical field of energy storage devices, and in particular, relates to a battery module, a battery pack and an apparatus using a battery cell as a power supply.

BACKGROUND

The battery module comprises a cover plate, a battery cell and a wire harness isolation plate assembly, where the wire harness isolation plate assembly is connected to the cover plate, thus protecting the wire harness isolation plate assembly through the cover plate. The wire harness isolation plate assembly and the cover plate are generally connected through a buckle or a rivet or the like.

However, when the wire harness isolation plate assembly and the cover plate are connected through a buckle or a rivet, the connecting reliability of the wire harness isolation plate assembly and the cover plate is poor thus affecting work of the battery module.

SUMMARY

The present application provides a battery module, a battery pack and an apparatus using a battery cell as a power supply, and the connecting reliability between a wire harness isolation plate assembly and a cover plate of the battery module is high.

A first aspect of embodiments in the present application provides a battery module, the battery module comprising: a plurality of battery cells, stacked along a length direction; a cover plate, located at an end portion of the battery cells along a height direction; and a wire harness isolation plate assembly, located between the cover plate and the battery cells along the height direction, where the cover plate is plug-connected to the wire harness isolation plate assembly.

In a possible design, the wire harness isolation plate assembly is provided with a plug hole, the cover plate is provided with an inserting piece, and the inserting piece is plug-connected to the plug hole.

In a possible design, along an extending direction of the plug hole, a size b of the inserting piece is greater than a size a of the plug hole plugged thereto.

In a possible design, the inserting piece comprises a body and protrusions; and along the extending direction of the plug hole, two ends of the body are both connected to the protrusions.

In a possible design, the wire harness isolation plate assembly further comprises a limiting portion, the limiting portion comprising a first end portion and a second end portion that are disposed opposite to each other; the body is provided with an opening, the first end portion is connected to a side wall of the opening, and the second portion stretches between the wire harness isolation plate assembly and the battery cells through the opening; and the plug hole is provided with an inner side wall close to the battery cells, and the second end portion is located at an inner side of the inner side wall.

In a possible design, the cover plate further comprises a cover plate body and a first extending portion, the first extending portion extending along the height direction of the battery module; and along the height direction, the cover plate body and the inserting piece are connected to two ends of the first extending portion, and the inserting piece is close to the battery cells.

In a possible design, the cover plate is provided with a sliding rail and the wire harness isolation plate assembly slides along the sliding rail.

In a possible design, the cover plate comprises a cover plate body and a second extending portion, the second extending portion being connected to the cover plate body; and the second extending portion comprises a curling, the curling forming the sliding rail with the second extending portion.

In a possible design, along an end portion in the length direction of the battery module, the wire harness isolation plate assembly is provided with the plug hole and the cover plate is provided with the inserting piece; and along a side portion in a width direction of the battery module, the cover plate is provided with the sliding rail and the sliding rail extends along the length direction.

In a possible design, the cover plate is provided with a notch, the notch is located at two ends of the cover plate along the length direction, and/or, the notch is located at two sides of the cover plate along the width direction.

A second aspect of embodiments in the present application provides a battery pack comprising a cabinet and the battery module described above, where the battery module is secured into the cabinet.

A third aspect of embodiments in the present application provides an apparatus using a battery cell as a power supply, the apparatus comprising: a power source for providing a driving force to the apparatus; and the battery module described above configured to provide electrical energy to the power source.

In the present application, when the thickness of the cover plate and/or the wire harness isolation plate assembly is relatively small, the cover plate and the wire harness isolation plate assembly are connected by means of plugging such that connecting reliability between the cover plate and the wire harness isolation plate assembly is relatively high, thereby helping to reduce the thickness of the cover plate and the wire harness isolation plate assembly while simultaneously improving the connecting reliability of the cover plate and the wire harness isolation plate assembly, thus further helping to increase energy density of the battery module.

It should be understood that the foregoing general descriptions and the following detailed descriptions are merely examples, and do not constitute any limitation on the present application.

BRIEF DESCRIPTION OF THE DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 2 and FIG. 1 are structural diagrams after an upper cover and a wire harness isolation plate assembly are coordinated in a first specific embodiment;

REFERENCE NUMERALS IN THE DRAWINGS

Figure 1:
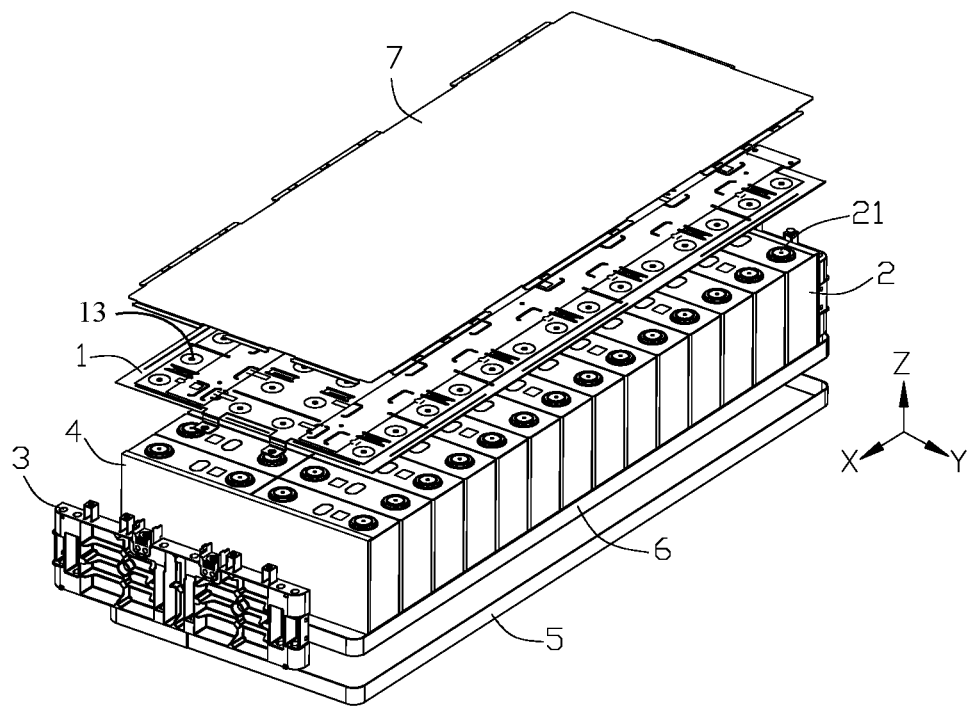
FIG. 1 is a structural diagram of a battery module provided by the present application in a specific embodiment.

A—Battery module;
B—Cabinet;
B1—Upper cabinet;
B2—Lower cabinet;
B3—Accommodating cavity;
1—Wire harness isolation plate assembly;
11—Insulating film;
111—First insulating film;
112—Second insulating film;
113—Hot press edge;
12—Plug hole;
121—First plug hole;
122—Second plug hole;
123—Inner side wall;
13—Connecting sheet;
2—Battery cell;
21—Electrode lead;
3—End plate;
4—Insulating cover;
5—First lace;
6—Second lace;
7—Cover plate;
71—Cover plate body;
72—Inserting piece;
721—Body;
722—Protrusion;
722a—Arc wall;
723—First extending portion;
724—Opening;
725—First inserting piece;
726—Second inserting piece;
73—Limiting portion;
731—First section;
731a—First end portion;
732—Second section;
732a—Second end portion;
74—Second extending portion;
741—Curling;
742—Sliding rail;
75—Notch.

The accompanying drawings herein are incorporated in the description as a part of the description, showing embodiments that are in accordance with the present application, and used together with the description to explain a principle of the present application.

DESCRIPTION OF EMBODIMENTS

For a better understanding of the technical solutions of the present application, the following describes the embodiments of the present application in details with reference to accompanying drawings.

It should be noted that the described embodiments are merely some but not all of the embodiments of the present application. All other embodiments obtained by a person of ordinary skill in the art based on the embodiments of the present application without creative efforts shall fall within the protection scope of the present application.

The terms used in the embodiments of the present application are merely for the purpose of illustrating specific embodiments, and are not intended to limit the present application. The terms "a", "the" and "this" of singular forms used in the embodiments and the appended claims of the present application are also intended to include plural forms, unless otherwise specified in the context clearly.

It should be understood that in this specification, a term "and/or" is only an associative relationship for describing associated objects, indicating that three relationships may exist. For example, A and/or B may indicate three situations: A exists alone; A and B exist simultaneously; and B exists alone. In addition, a character "I" in this specification generally indicates an "or" relationship between contextually associated objects.

It should be noted that the directional terms such as "up", "down", "left", and "right" described in the embodiments of the present application are described as seen from the angles shown in the accompanying drawings, and should not be understood as a limitation to the embodiments of the present application In addition, in the context, it should be further understood that when an element is referred to as being connected "above" or "under" another element, the element can not only be directly connected "above" or "under" the another element, but also be indirectly connected "above" or "under" the another element through an intermediate element.

Embodiments of the present application provide an apparatus using a battery cell 2 as a power supply, a battery pack, a battery module A and a connecting assembly 1, where the apparatus using a battery cell 2 as a power supply comprises a vehicle, a ship, a small aircraft, and other mobile devices. The apparatus comprises a power source for providing a driving force to the apparatus and the power source can be configured as the battery module A for providing electrical energy to the power source. The driving force of the apparatus can all be electrical energy and can also comprise electrical energy and other energy (for example mechanic energy). The power source can be the battery module A (or the battery pack) and can also be the battery module A (or the battery pack) and an engine etc. Therefore, an apparatus shall be within the protection scope of the present application as long as the apparatus is capable of using the battery cell 2 as a power supply.

With a vehicle as an example, the vehicle in embodiments of the present application can be a new energy vehicle, which can be a pure electric vehicle or can be a hybrid power vehicle or an extended-range vehicle etc. The vehicle can comprise a battery pack and a vehicle body, where the battery pack is disposed to the vehicle body, and the vehicle body is further provided with a driving motor, which is electrically connected to the battery pack and for which electrical energy is provided by the battery pack. The driving motor is connected through a transmission mechanism to wheels on the vehicle body so as to drive the vehicle to travel ahead. Specifically, the battery pack can be horizontally disposed at bottom of the vehicle body.

Figure 18:
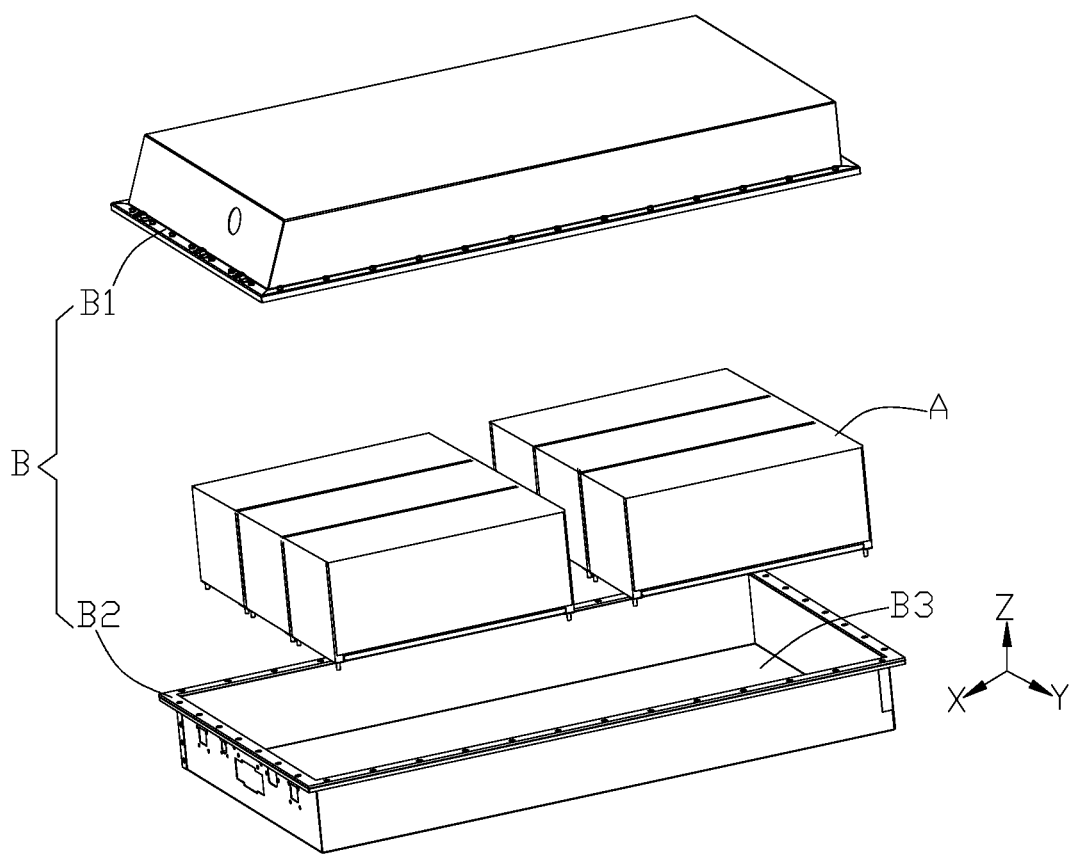
FIG. 18 is a structural diagram of a battery pack provided by the present application in a specific embodiment.

As shown in FIG. 18, the battery pack comprises a cabinet B and the battery module A of the present application, where the cabinet B has an accommodating cavity B3, into which the battery module A is accommodated. The number of the battery module A is one or multiple and a plurality of battery modules A are arranged in the accommodating cavity B3. The type of the cabinet B is not limited, as it can be a frame-like cabinet, a disk-like cabinet or a box-like cabinet etc. Specifically, as shown in FIG. 18, the cabinet B can comprise a lower cabinet B2 which accommodates the battery module A and an upper cabinet B1 which covers and opens the lower cabinet B2.

More specifically, as shown in FIG. 1, the battery module A comprises a plurality of battery cells 2 and a frame structure for securing the battery cell 2, where the battery cell 2 can be a secondary battery that is capable of repeated charging and discharging for use, the plurality of battery cells 2 are stacked to each other and the stacking direction of each battery cell 2 is defined as the length direction X as stated in the present application. The battery cell 2 comprises an electrode lead 21 and each of the battery cells 2 comprises a positive electrode lead and a negative terminal. In the battery module A, adjacent battery cells 2 are electrically connected specifically in connecting manners like series connection, parallel connection or series-parallel connection.

Specifically, the frame structure comprises an end plate 3, the end plate 3 being located at two end portions of the battery cells 2 along the length direction X for limiting movement of the battery cells 2 along the length direction X, and an insulating cover 4 is provided between the end plate 3 and the battery cells 2, the insulating cover 4 being used for realizing insulation between the end plate 3 and the battery cells 2. Meanwhile, in a specific embodiment, the frame structure can further comprise a side plate (not shown in drawings) Two side plates are located at two sides of the battery cells 2 along a width direction Y and the side plate is connected to the end plate 3, thereby forming the frame structure. In another specific embodiment, the frame structure may not be provided with a side plate. After the battery cells 2 are stacked, by connecting a first lace 5 to a second lace 6, the above frame structure is formed with the end plate 3 and the above two laces. The frame structure may further comprise a cover plate 7 located at an end portion of the battery cells 2 along a height direction (Z) for limiting movement of the battery cells 2 along the height direction Z.

Figure 4:
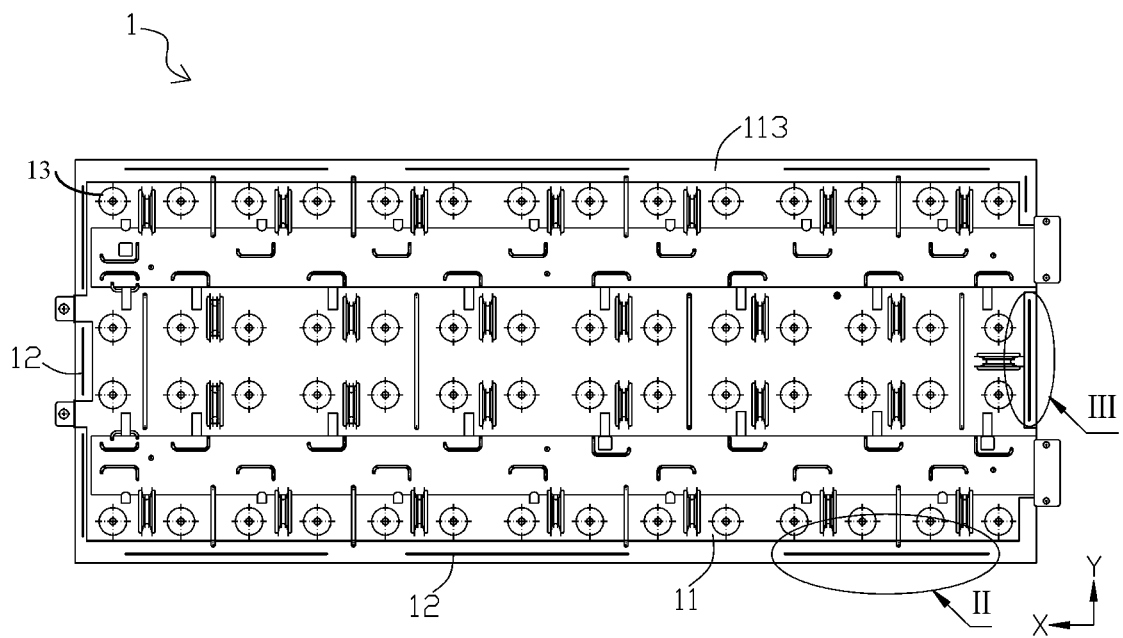
FIG. 4 is a top view of a wire harness isolation plate assembly in FIG. 1 in a first specific embodiment.

Meanwhile, as shown in FIG. 1, the battery module A further comprises a wire harness isolation plate assembly 1, the wire harness isolation plate assembly 1 being placed close to one end of the electrode lead 21 of the battery cells 2 and being located between the cover plate 7 and the battery cells 2. In the embodiment as shown in FIG. 1, the wire harness isolation plate assembly 1 is located above the battery cells 2 and under the cover plate 7. As shown in FIG. 1, the wire harness isolation plate assembly 1 comprises a connecting sheet 13, the connecting sheet 13 being used for connecting an electrode lead 21 of the battery cell 2. As shown in FIG. 4, the wire harness isolation plate assembly 1 comprises a plurality of connecting sheets 13 and the battery cells 2 are connected through the connecting sheets 13. For example, when the battery cells 2 are in series connection, a positive electrode lead of one battery cell 2 is connected to a negative electrode lead of its adjacent battery cell 2 through the connecting sheet 13 and the position for disposing each of the connecting sheets 13 changes with the position of the battery cells 2 and the connecting manner.

In the related art, the cover plate 7 and the wire harness isolation plate assembly 1 are connected through a buckle or a rivet. The above two connecting manners are of high connecting reliability when the thickness of the cover plate 7 and the wire harness isolation plate assembly 1 is large. However, in order to increase energy density of the battery module A, the thickness of the cover plate 7 and the wire harness isolation plate assembly 1 reduces gradually. When the thickness of the cover plate 7 and/or the wire harness isolation plate assembly 1 is small and the cover plate 7 and the wire harness isolation plate assembly 1 are connected through a buckle or a rivet, the connecting reliability declines. In order to solve the technical problem, the cover plate 7 in the present application is plug-connected to the wire harness isolation plate assembly 1.

In the present application, the manner of plug-connection between the cover plate 7 and the wire harness isolation plate assembly 1 is adapted to a case in which the thickness of the cover plate 7 and/or the wire harness isolation plate assembly 1 is small, and the plug-connection between the cover plate 7 and the wire harness isolation plate assembly 1 is still of high connecting reliability when the thickness of the cover plate 7 and the wire harness isolation plate assembly 1 is small, thereby further helping to reduce the thickness of the cover plate 7 and the wire harness isolation plate assembly 1 while simultaneously improving the connecting reliability of the cover plate 7 and the wire harness isolation plate assembly 1, thus helping to increase energy density of the battery module A.

Specifically, in a specific embodiment, as shown in FIG. 3, FIG. 5, FIG. 6 and FIG. 8, the wire harness isolation plate assembly 1 is provided with a plug hole 12, the cover plate 7 is provided with an inserting piece 72, and the inserting piece 72 is plug-connected to the plug hole 12. The cover plate 7 comprises a cover plate body 71, and an edge of the cover plate body 71 is provided with an inserting piece 72, and the inserting piece 72 is disposed in correspondence to a position of the plug hole 12 of the wire harness isolation plate assembly 1. A plug-connection of the cover plate 7 to the wire harness isolation plate assembly 1 is realized by inserting the inserting piece 72 into the plug hole 12 and the cover plate 7 and the wire harness isolation plate assembly 1 are fixed as one.

Figure 5:
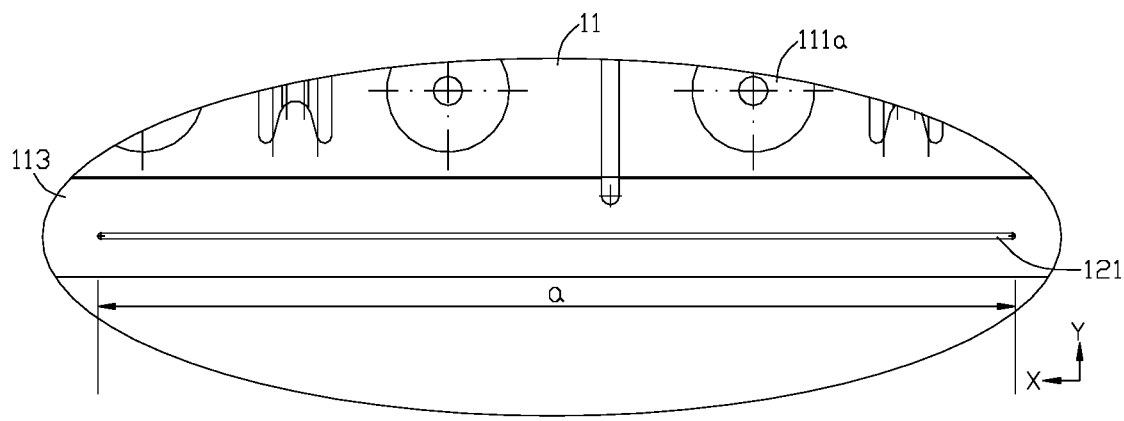
FIG. 5 is a locally enlarged view of part II in FIG. 4.
Figure 6:
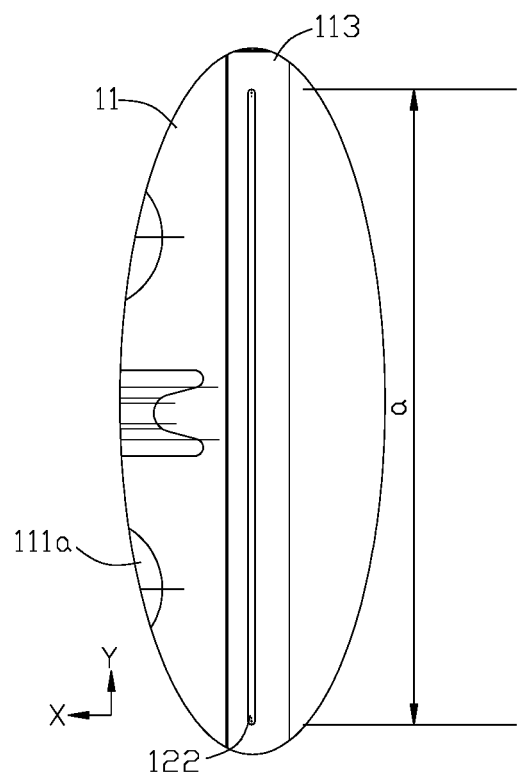
FIG. 6 is a locally enlarged view of part III in FIG. 4.

In the embodiment, the wire harness isolation plate assembly 1 comprises an insulating film 11 and a connecting sheet 13, where the insulating film 11 comprises a first insulating film 111 and a second insulating film 112, the first insulating film 111 and the second insulating film 112 are respectively located at two ends of the connecting sheet 13 along the height direction Z, and the first insulating film 111 and the second insulating film 112 are hot-press connected such that the first insulating film 111 and the second insulating film 112 are heated for lamination into one, thus fixing the connecting sheet 13 between the first insulating film 111 and the second insulating film 112. As shown in FIG. 5 and FIG. 6, after the wire harness isolation plate assembly 1 is hot-press processed, the first insulating film 111 and the second insulating film 112 are made to form a hot press edge 113, the hot pressure 113 being located at two ends of the wire harness isolation plate assembly 1 along the length direction X and two sides along the width direction Y. Moreover, the hot press edge 113 comprises portions of two ends of the first insulating film 111 and the second insulating film 112 along the length direction X and two sides of the first insulating film 111 and the second insulating film 112 along the width direction Y, without comprising a connecting sheet 13. The hot press edge 113 is used for plugging of the cover plate 7. Therefore, the above plug hole 12 is disposed at the hot press edge 113, thus avoiding effect on the connecting sheet after the plug hole 12 is provided.

Meanwhile, the first insulating film 111 and the second insulating film 112 are plastic films, that is, the hot press edge 113 is of a plastic structure. As compared with the cover plate 7, the hot press edge 113 is small in its rigidness. Therefore, in the embodiment, when the inserting piece 72 is disposed at the cover plate 7 and the plug hole 12 is disposed at the wire harness isolation plate assembly 1 (the hot press edge 113), the rigidness of the inserting piece 72 can be improved, thus further improving the connecting reliability between the cover plate 7 and the wire harness isolation plate assembly 1.

Specifically, along an extending direction of the plug hole 12, a size b of the inserting piece 72 is greater than a size a of the plug hole 12 plugged thereto. The extending direction of the plug hole 12 is a size of one end with a greater size in the plug hole 12. Moreover, the plug hole 12 comprises a first plug hole 121 and a second plug hole 122. The above inserting piece 72 comprises a first inserting piece 725 and a second inserting piece 726, the first inserting piece 725 being plugged to the first plug hole 121 and the second inserting piece 726 being plugged to the second plug hole 122.

As shown in FIG. 5, an extending direction of the first plug hole 121 is the length direction X (a size a of its length direction X is greater than a size of other directions), that is, the length of the first plug hole 121 is a, and the first inserting piece 725 and the first plug hole 121 coordinate to limit relative movement of the cover plate 7 and the wire harness isolation plate assembly 1 along the width direction Y and the height direction Z. As shown in FIG. 6, an extending direction of the second plug hole 122 is the width direction Y (a size a of its width direction Y is greater than a size of other directions), that is, the length of the second plug hole 122 is a and the second inserting piece 726 and the second plug hole 122 coordinate to limit relative movement of the cover plate 7 and the wire harness isolation plate assembly 1 along the length direction X and the height direction Z.

In the embodiment, when a size b of the inserting piece 72 is greater than a size a of a plug hole 12 plugged thereto, risk for the inserting piece 72 to be off from the plug hole 12 is capable of being reduced after plugging the inserting piece 72 to the plug hole 12, thus further improving the plugging reliability between the inserting piece 72 and the plug hole 12.

More specifically, as shown in FIG. 5 and FIG. 6, the first plug hole 121 and the second plug hole 122 are both long circular holes. An arc structure at two ends of the long circular hole is capable of reducing risk of tearing off the plug hole 12, thus improving strength of the plug hole 12. Meanwhile, a width of each plug hole 12 (a size of one end with a smaller size) can range 0.5 mm-1 mm. For example, a width of the above plug hole 12 can be 0.8 mm, 0.9 mm and the like. In the embodiments, when the width of the plug hole 12 is excessively big, the risk for the inserting piece 72 to be off from the plug hole 12 is high. When the width of the plug hole 12 is excessively small, it is not easy for the inserting piece 72 to be inserted inside. Therefore, in an actual working condition, factors of the above two aspects can be comprehensively considered to reasonably set the width of the plug hole 12, as it should not be limited to 0.5 mm-1 mm.

Figure 8:
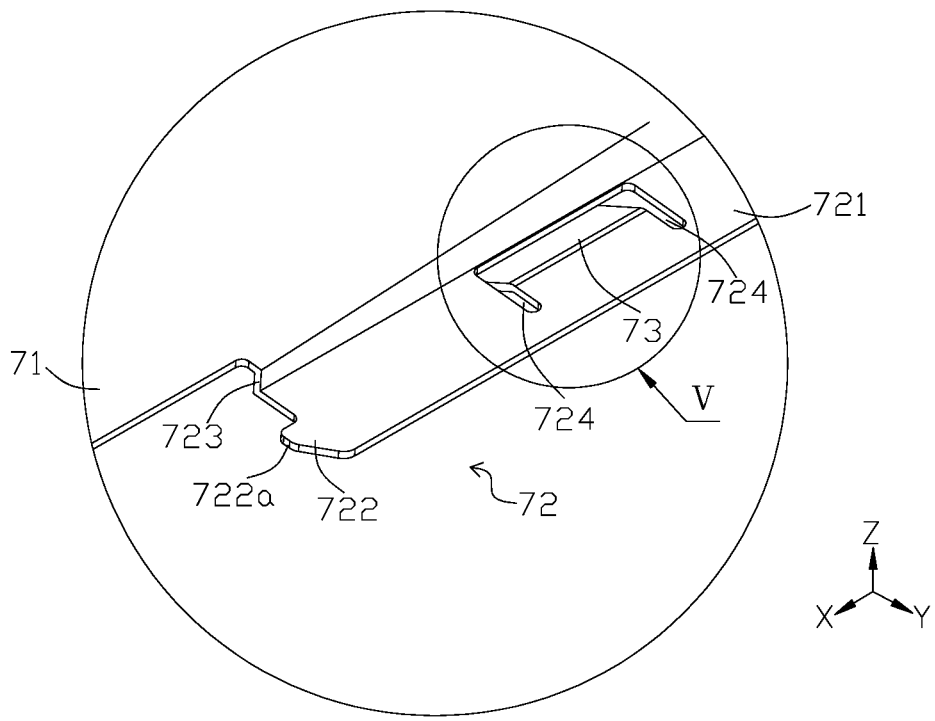
FIG. 8 is a locally enlarged view of part IV in FIG. 7.

In a possible design, as shown in FIG. 8, the inserting piece 72 comprises a body 721 and protrusions 722, and along the extending direction of the plug hole 12, two ends of the body 721 are both connected to the protrusions 722.

In the embodiments, the protrusions 722 at two sides of the body 721 are capable of further reducing a risk for the inserting piece 72 to be off from the plug hole 12, thus further enhancing connecting reliability between the cover plate 7 and the wire harness isolation plate assembly 1.

As shown in FIG. 8, the protrusions 722 each comprises an arc wall 722a, which is capable of reducing abrasion of the inserting piece 72 and the plug hole 12 in a plugging process and enhancing the structural strength thereof.

Figure 9:
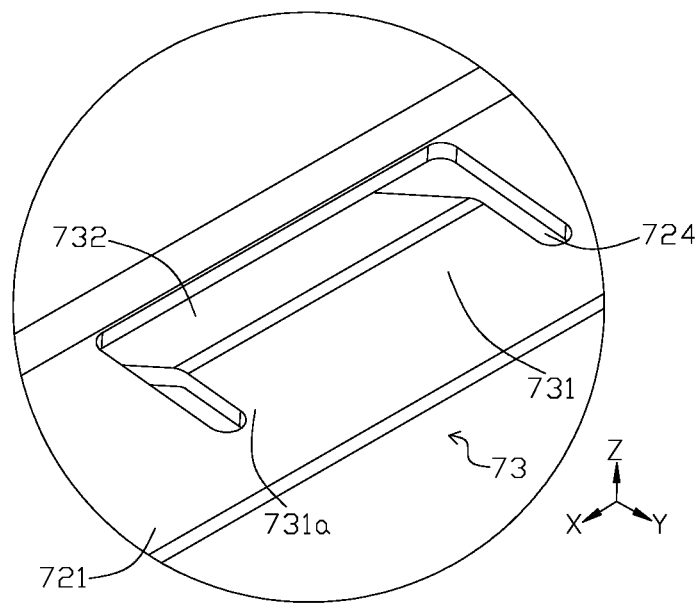
FIG. 9 is a locally enlarged view of part V in FIG. 8.
Figure 10:
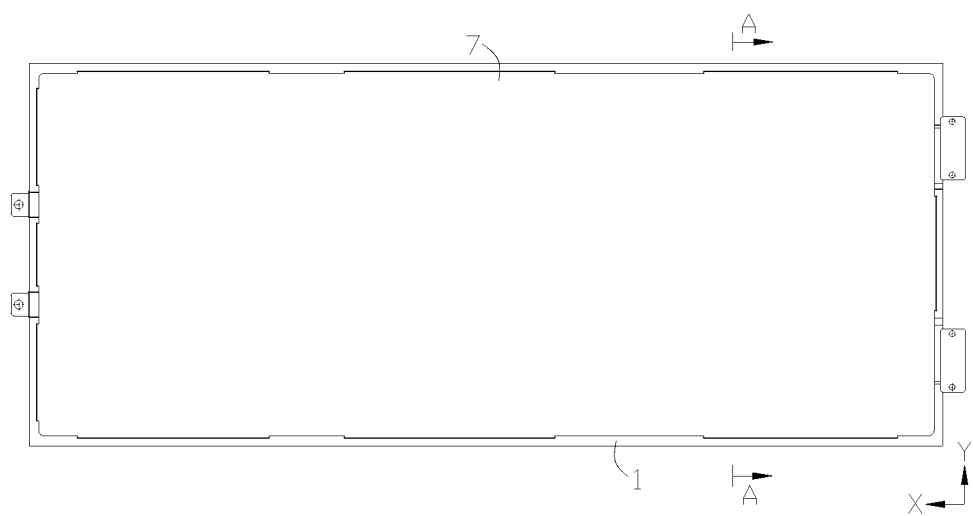
FIG. 10 is a top view of FIG. 2.
Figure 11:
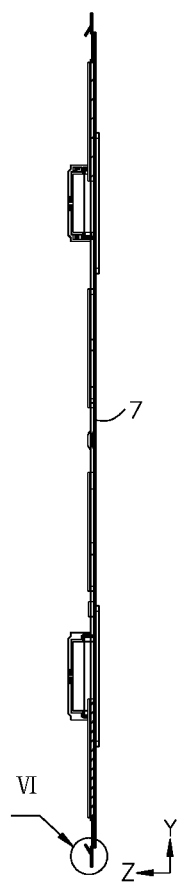
FIG. 11 is an A-A section view of FIG. 10.
Figure 12:
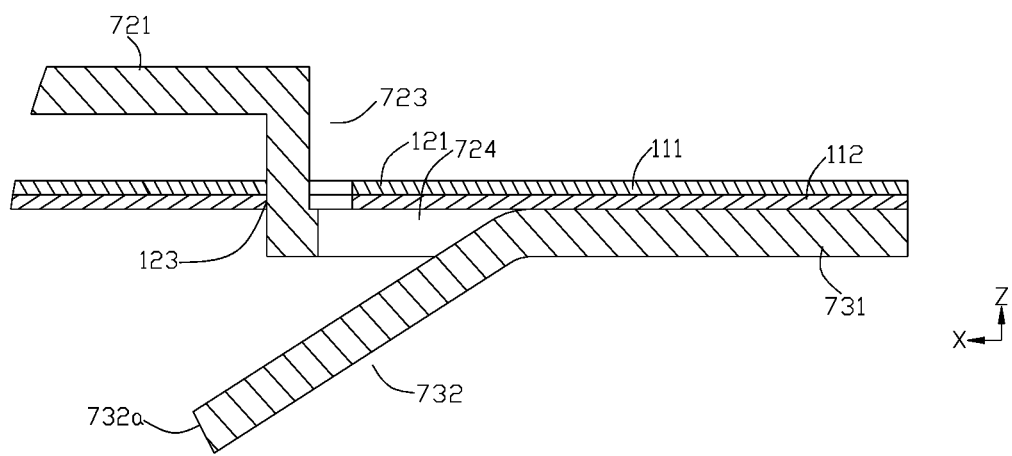
FIG. 12 is a locally enlarged view of part VI in FIG. 11.

More specifically, as shown in FIG. 8, FIG. 9 and FIG. 12, the wire harness isolation plate assembly 1 further comprises a limiting portion 73 for limiting escaping of the inserting piece 72 from the plug hole 12, thus further improving plugging reliability of the inserting piece 72 and the plug hole 12. The limiting portion 73 comprises a first section 731 and a second section 732, the first section 731 having a first end portion 731a and the second section 732 having a second end portion 732a. Moreover, the first end portion 731a is disposed opposite to the second end portion 732a, that is, the first end portion 731a and the second end portion 732a are disposed at two ends of the limiting portion 73 toward directions where the first end portion 731a and the second end portion 732a are away from each other. In the inserting piece 72, the body 721 thereof has an opening 724. The first end portion 731a is connected to a side wall of the opening 724, and the side wall is a side wall at one side close to an end portion of the body 721 along the width direction Y. The second end portion 732a stretches between the wire harness isolation plate assembly 1 and the battery cells 2 via the opening 724, that is, the second end portion 732a stretches below the cover plate 7 via the opening 724.

As shown in FIG. 12, in the limiting portion 73, the second section 732 is bent relative to the first section 731 in a bending direction toward the battery cells 2 (that is, the second section 732 is bent downward relative to the first section 731). After the second section 732 being bent, the second section 732 stretches below the cover plate from the opening 724. Meanwhile, as shown in FIG. 12, the plug hole 12 has an inner side wall 123 close to the battery cells 2. The second end portion 732a of the above limiting portion 73 is located at an inner side of the inner side wall 123. The second end portion 732a herein is located at an inner side of the inner side wall 123, which means that the second end portion 732a of the limiting portion 73 is closer to the side of the battery cells 2 than the inner side wall 123.

In the embodiments, the inserting piece 72 is disposed at the limiting portion 73, and when the second end portion 732a of the limiting portion 73 is located at an inner side of the inner side wall 123 of the plug hole 12, the limiting portion 73 is capable of reducing a risk for the inserting piece 72 to be off from the plug hole 12.

Figure 7:
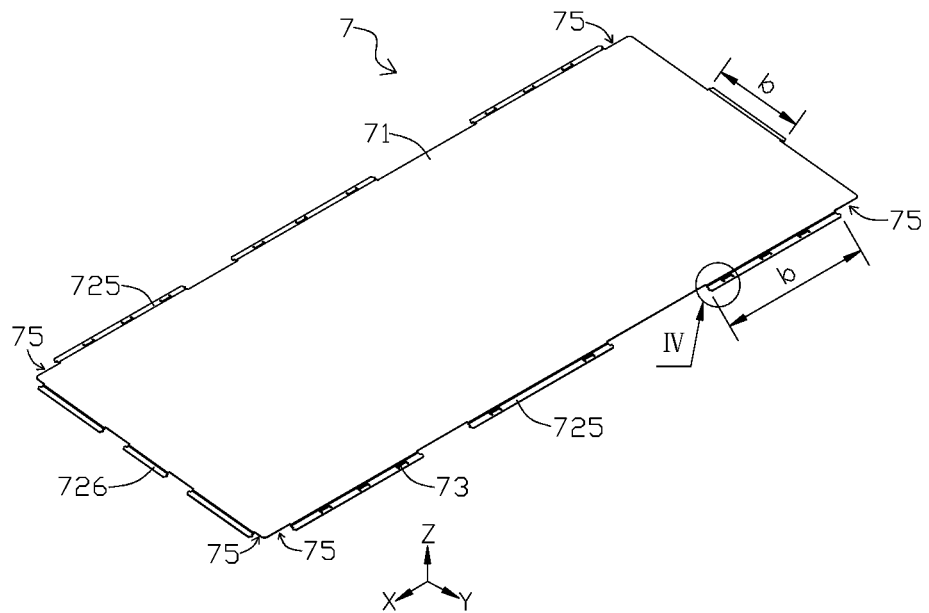
FIG. 7 is a structural diagram of an upper cover in FIG. 2 in a specific embodiment.

Specifically, as shown in FIG. 7, in the inserting piece 72 a plurality of limiting portions 73 can be disposed and each of the limiting portions 73 is disposed at an interval, thus further reducing a risk for the inserting piece 72 to be off from the plug hole 12. Moreover, whether to dispose the limiting portions 73 in the inserting piece 72 and the specific number of the limiting portions 73 to be disposed are determined according to a length b of the inserting piece 72. When the length b of the inserting piece 72 is small, the limiting portions 73 may not be disposed in the inserting piece 72. When the length b of the inserting piece 72 is big, a plurality of limiting portions 73 can be disposed in the inserting piece 72. Therefore, in the embodiments, the number of the limiting portions 73 to be disposed is not defined.

Figure 2:
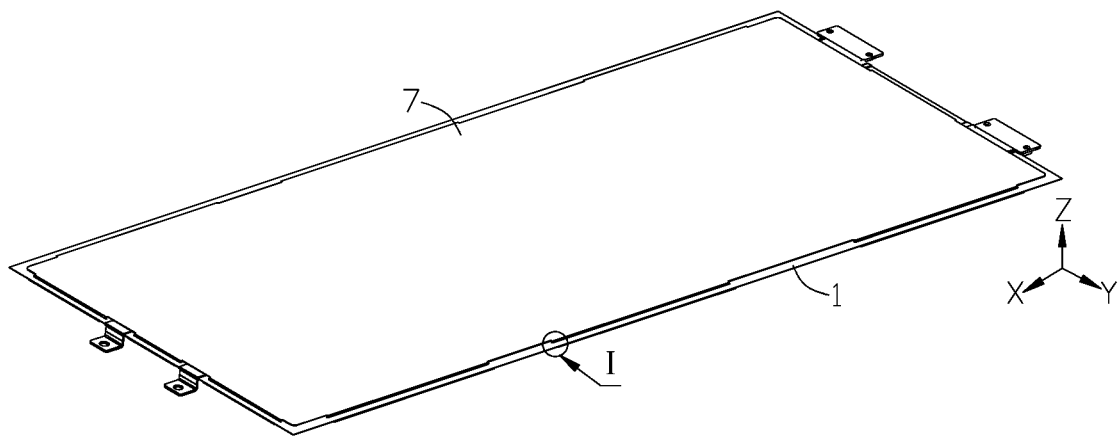
Figure 3:
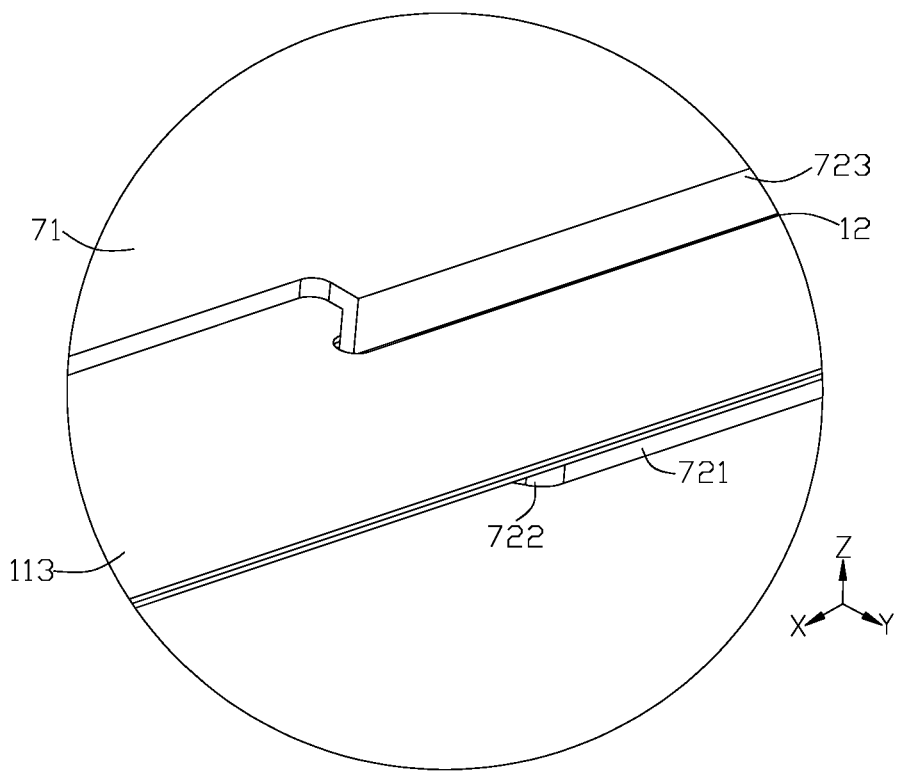
FIG. 3 is a locally enlarged view of part I in FIG. 1.

In the above embodiments, as shown in FIG. 8, the inserting piece 72 further comprises a first extending portion 723, the first extending portion 723 extending along the height direction Z, and one end of the first extending portion 723 being connected to the cover plate body 71, and the other end of the first extending portion 723 being connected to the body 721 of the inserting piece 72, such that the inserting piece 72 is made to close the battery cells 2. In embodiments shown in FIG. 2, the inserting piece 72 is located under the cover plate body 71. As shown in FIG. 3, the first extending portion 723 disposed provides a mounting position for the hot press edge 113 of the wire harness isolation plate assembly 1, that is, after plugging, along the height direction Z, the hot press edge 113 is located between the body 721 of the inserting piece 72 and the cover plate body 71, and the hot press edge 113 abuts against the body 721.

In another aspect, as shown in FIG. 4 and FIG. 7, along the length direction X, two ends of the cover plate 7 are provided with a plurality of first inserting pieces 725 and each of the first inserting pieces 725 is disposed at an interval. Correspondingly, two ends of the wire harness isolation plate assembly 1 are provided with a plurality of first plug holes 121 and each of the first plug holes 121 is disposed at an interval. The positions for disposing the first inserting pieces 725 and the first plug holes 121 and the number of the first inserting pieces 725 and the first plug holes 121 to be disposed can be determined according to a size of the battery module A along the length direction X.

Meanwhile, along the width direction Y, two sides of the cover plate 7 are provided with a plurality of second inserting pieces 726 and each of the second inserting pieces 726 is disposed at an interval. Correspondingly, two sides of the wire harness isolation plate assembly 1 are provided with a plurality of second plug holes 122 and each of the second plug holes 122 is disposed at an interval. The positions and the number for disposing the second inserting pieces 726 and the second plug holes 122 can be determined according to a size of the battery module A along the width direction Y.

In the cover plate 7, the inserting piece 72 and the cover plate body 71 can be integrally stamp-formed. Meanwhile, the limiting portion 73 and the inserting piece 72 can be integrally stamp-formed.

Figure 13:
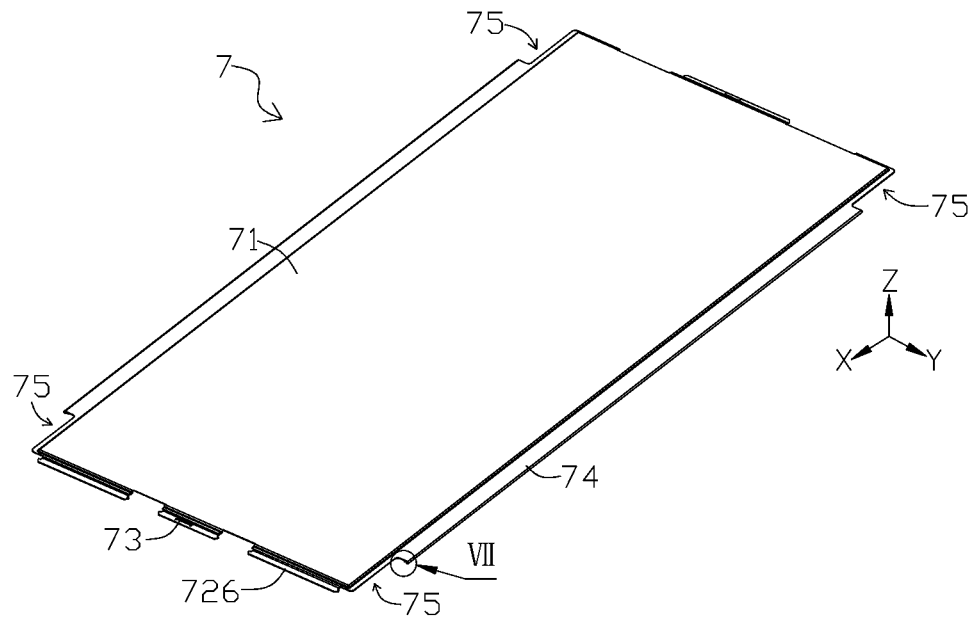
FIG. 13 is a structural diagram after an upper cover and a wire harness isolation plate assembly are coordinated in FIG. 1 in a second specific embodiment.
Figure 14:
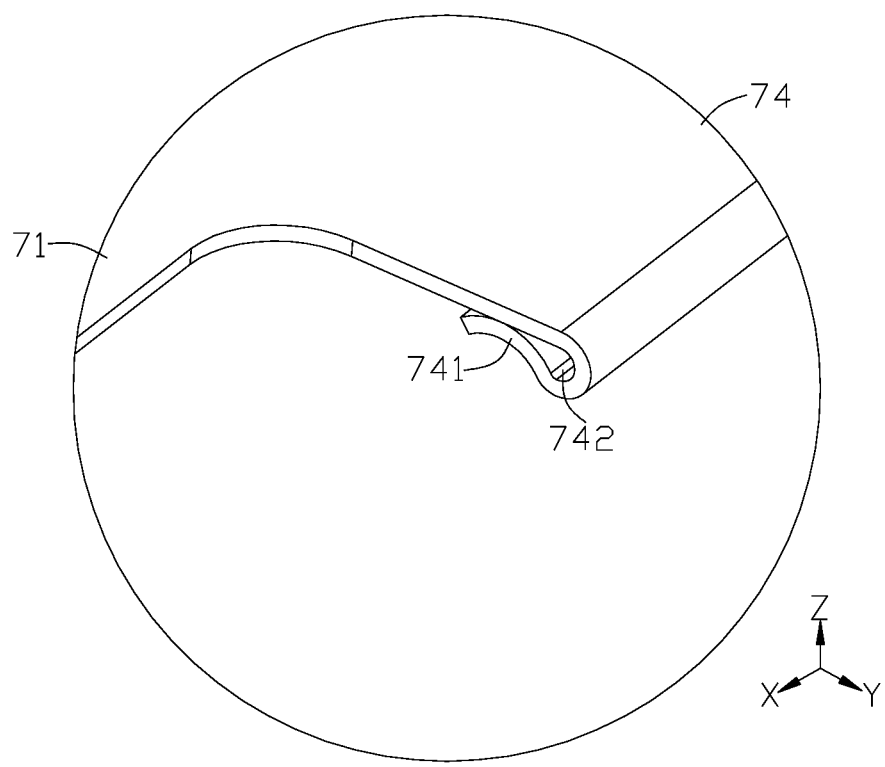
FIG. 14 is a locally enlarged view of part VII in FIG. 13.
Figure 15:
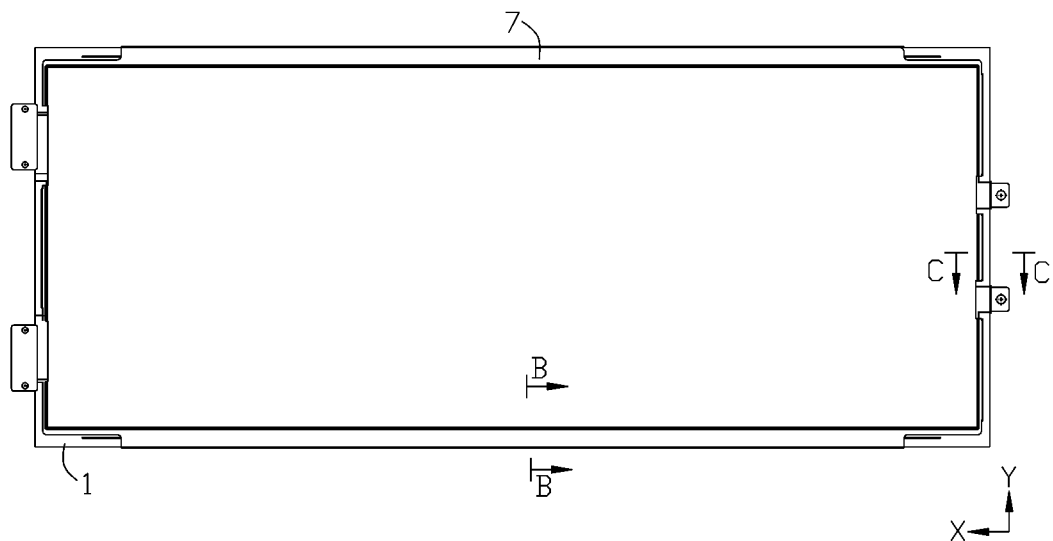
FIG. 15 is a top view of FIG. 13.
Figure 16:
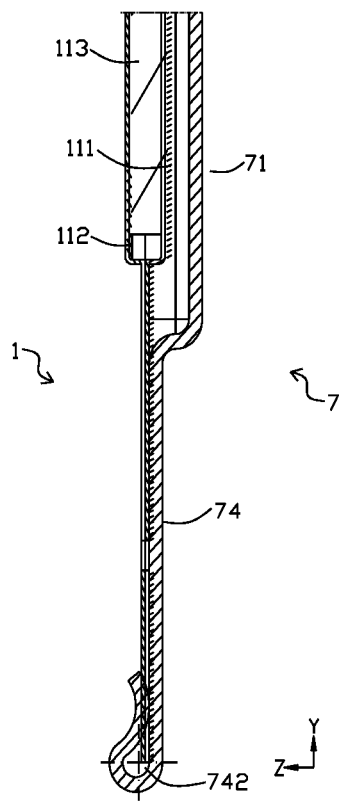
FIG. 16 is a B-B section view of FIG. 15.
Figure 17:
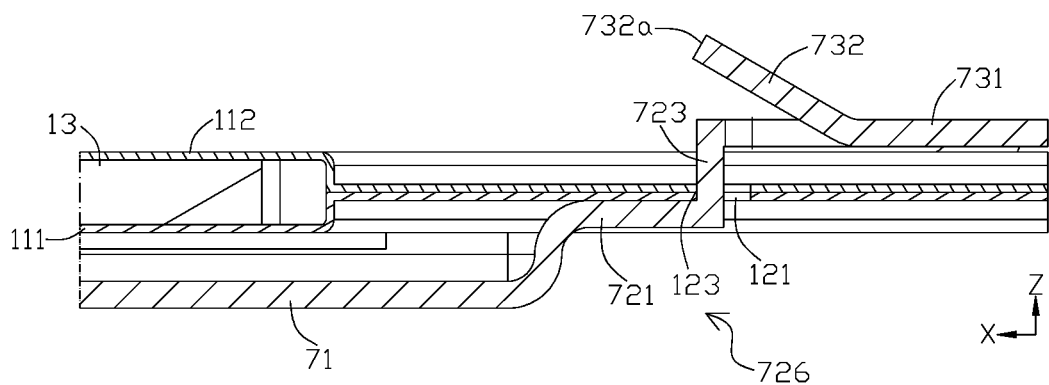
FIG. 17 is a C-C section view of FIG. 15.

In another specific embodiment, as shown in FIG. 13 and FIG. 14, the cover plate body 71 of the cover plate 7 is provided with a sliding rail 742 and the hot press edge 113 of the wire harness isolation plate assembly 1 is capable of sliding along the sliding rail 742.

In the embodiments, the wire harness isolation plate assembly 1 and the sliding rail 742 are also plug-connected, that is, the hot press edge 113 of the wire harness isolation plate assembly 1 is plugged to the sliding rail 742. Meanwhile, the wire harness isolation plate assembly 1 and the sliding rail 742 are plugged in a relative sliding manner. Therefore, the plug-connecting manner in the embodiments is capable of improving connecting reliability between the wire harness isolation plate assembly 1 and the cover plate 7, and of simplifying the structure and process of the plug-connection. Meanwhile, through relative sliding of the wire harness isolation plate assembly 1 and the cover plate 7, the relative positions of the wire harness isolation plate assembly 1 and the cover plate 7 can also be adjusted.

In a specific embodiment, as shown in FIG. 13, in the cover plate 7, along the width direction Y, two sides of the cover plate 7 are provided with a sliding rail 742 and the sliding rail 742 extends along the length direction X. Correspondingly, the hot press edge 113 located two sides of the wire harness isolation plate assembly 1 along the width direction Y is movable along the corresponding sliding rail 742, thus limiting relative movement of the wire harness isolation plate assembly 1 and the cover plate 7 along the height direction Z and the width direction Y. Meanwhile, in the cover plate 7, along the length direction X, two ends of the cover plate 7 are provided with second inserting pieces 726 and the second inserting pieces 726 can be disposed at the limiting portion 73. Correspondingly, the hot press edge of the wire harness isolation plate assembly 1 along two sides of the length direction X is provided with second plug holes 122, and the second inserting pieces 726 are plugged to the second plug holes 122, thus limiting relative movement of the wire harness isolation plate assembly 1 and the cover plate 7 along the height direction Z and the length direction X.

Certainly, in the cover plate 7, the sliding rail 742 and the inserting piece 72 can be further disposed as follows: two ends along the length direction X are provided with the sliding rail 742 that extends along the width direction Y; and two sides along the width direction Y are provided with first inserting pieces 725, which can be provided with a limiting portion 73.

Specifically, as shown in FIG. 14, the cover plate 7 comprises a cover plate body 71 and a second extending portion 74, the second extending portion 74 extending along the length direction X, or the second extending portion 74 extending along the width direction Y, and the second extending portion 74 being connected to the cover plate body 71. The second extending portion 74 comprises a curling 741, the curling 741 being bent relative to the second extending portion 74, and the curling 741 enclosing the sliding rail 742 with the second extending portion 74.

In the embodiments, the second extending portion 74 and the cover plate body 71 are integrally formed. Meanwhile, the curling 741 is formed in a manner of integral stamp-forming at the second extending portion 74, that is, the sliding rail 742 is integrally stamp-formed through the cover plate 7. Certainly, the manner of forming the above sliding rail 742 is not limited to this, as the sliding rail 742 can be formed through welding at the cover plate body 71 and other manners. In the embodiments, the manner of integrally forming the sliding rail 742 and the cover plate 7 has advantages like simplified processing technique and high reliability of the sliding rail 742.

As shown in FIG. 14, the curling 741 is elastic to a certain degree. When the sliding rail 742 does not coordinate with the wire harness isolation plate assembly 1, the curling 741 abuts against the second extending portion 74 under elastic effects, and when the sliding rail 742 coordinates with the wire harness isolation plate assembly 1, the hot press edge 113 of the wire harness isolation plate assembly 1 is capable of overcoming elastic force of the curing 741 and the second extending portion 74, thus stretching into the sliding rail 742 between the curling 741 and the second extending portion 74.

As shown in FIG. 7 and FIG. 13, along the length direction X, two ends of the cover plate 7 are provided with a notch 75 and along the width direction Y, two sides of the cover plate 7 is provided with a notch 75. The notch 75 disposed is capable of realizing plugging between the inserting piece 72 and the plug hole 12. Meanwhile, the notch 75 disposed is also capable of realizing plugging between the sliding rail 742 and the wire harness isolation plate assembly 1.

To sum up, in the present application, the wire harness isolation plate assembly 1 and the cover plate 7 are plug-connected. When the thickness of the wire harness isolation plate assembly 1 and the cover plate 7 is relatively small, the plug-connection can still ensure high connecting reliability between the wire harness isolation plate assembly 1 and the cover plate 7.

The foregoing descriptions are merely preferable embodiments of the present application, but are not intended to limit the present application. A person skilled in the art understands that the present application may have various modifications and variations. Any modification, equivalent replacement, and improvement made within the spirit and principle of the present application shall fall within the protection scope of the present application.

What is claimed is:

1. A battery module, the battery module comprising:
   a plurality of battery cells, stacked along a length direction;
   a cover plate, located at an end portion of the battery cells along a height direction;
   and a wire harness isolation plate assembly, located between the cover plate and the battery cells along the height direction,
   wherein the cover plate is plug-connected to the wire harness isolation plate assembly;
   wherein the wire harness isolation plate assembly is provided with a plug hole, the cover plate is provided with an inserting piece, and the inserting piece is plug-connected to the plug hole; and
   wherein the wire harness isolation plate assembly comprises a connecting sheet, a first insulating film and a second insulating film, the first insulating film and the second insulating film are respectively located at two ends of the connecting sheet along the height direction, and the first insulating film and the second insulating film are hot-press connected to form a hot press edge, and the connecting sheet is fixed between the first insulating film and the second insulating film, and the plug hole is disposed at the hot press edge.

2. The battery module according to claim 1, wherein along an extending direction of the plug hole, a size b of the inserting piece is greater than a size a of the plug hole plugged thereto.

3. The battery module according to claim 1, wherein the inserting piece comprises a body and protrusions; and
   along the extending direction of the plug hole, two ends of the body are both connected to the protrusions.

4. The battery module according to claim 3, wherein the protrusions each comprises an arc wall.

5. The battery module according to claim 3, wherein the inserting piece is provided with a limiting portion; and
   the body is provided with an opening, at least one part of the limiting portion stretches below the cover plate through the opening.

6. The battery module according to claim 5, wherein the limiting portion comprises a first section and a second section, the first section having a first end portion and the second section having a second end portion, the first end portion and the second end portion are disposed at two ends of the limiting portion toward directions where the first end portion and the second end portion are away from each other, the second section is bent relative to the first section in a bending direction toward the battery cells, and the second end portion is located at an inner side of the inner side wall.

7. The battery module according to claim 5, wherein a plurality of limiting portions are disposed in the inserting piece and each of the limiting portions is disposed at an interval.

8. The battery module according to claim 1, a width of the plug hole ranges 0.5 mm-1 mm.

9. The battery module according to claim 1, wherein the cover plate further comprises a cover plate body and a first extending portion, the first extending portion extending along the height direction of the battery module; and
   along the height direction, the cover plate body and the inserting piece are connected to two ends of the first extending portion, and the inserting piece is close to the battery cells relative to the cover plate body.

10. The battery module according to claim 9, wherein along the length direction, two ends of the cover plate are provided with a plurality of the inserting pieces, and each of the inserting pieces is disposed at an interval.

11. The battery module according to claim 9, wherein along the width direction, two sides of the cover plate are provided with a plurality of the inserting pieces, and each of the inserting pieces is disposed at an interval.

12. The battery module according to claim 1, wherein the cover plate is provided with a sliding rail, and the wire harness isolation plate assembly is plugged to the sliding rail and slides along the sliding rail.

13. The battery module according to claim 12, wherein the cover plate comprises a cover plate body and a second extending portion, the second extending portion being connected to the cover plate body; and
   the second extending portion comprises a curling, the curling forming the sliding rail with the second extending portion.

14. The battery module according to claim 13, wherein the curling is elastic, when the sliding rail does not coordinate with the wire harness isolation plate assembly, the curling abuts against the second extending portion, and when the sliding rail coordinates with the wire harness isolation plate assembly, the wire harness isolation plate assembly is capable of stretching into the sliding rail between the curling and the second extending portion.

15. The battery module according to claim 12, wherein along an end portion in the length direction of the battery module, the wire harness isolation plate assembly is provided with the plug hole and the cover plate is provided with the inserting piece; and
   along a side portion in a width direction of the battery module, the cover plate is provided with the sliding rail and the sliding rail extends along the length direction.

16. The battery module according to claim 15, wherein the cover plate is provided with a notch, the notch located at two ends of the cover plate along the length direction, and/or, the notch located at two sides of the cover plate along the width direction.

17. A battery pack, characterized in that the battery pack comprises a cabinet and the battery module as claimed in claim 1, wherein the battery module is secured into the cabinet.

18. An apparatus using a battery cell as a power supply, the apparatus comprising:
  a power source for providing a driving force to the apparatus; and
  the battery module in claim 1 configured to provide electrical energy to the power source.

* * * * *

UNITED STATES PATENT AND TRADEMARK OFFICE
CERTIFICATE OF CORRECTION

PATENT NO. : 12,249,731 B2  
APPLICATION NO. : 17/563933  
DATED : March 11, 2025  
INVENTOR(S) : Xuguang Wang et al.

Page 1 of 1

It is certified that error appears in the above-identified patent and that said Letters Patent is hereby corrected as shown below:

On the Title Page

Item (71), Applicant should read as follows:  
CONTEMPORARY AMPEREX TECHNOLOGY (HONG KONG) LIMITED, Hong Kong (CN)

Signed and Sealed this  
Third Day of June, 2025

Coke Morgan Stewart  
*Acting Director of the United States Patent and Trademark Office*